United States Patent
Bourgy et al.

(10) Patent No.: US 6,905,312 B2
(45) Date of Patent: Jun. 14, 2005

(54) METHOD OF MANUFACTURING AN INTEGRAL ROTOR BLADE DISK AND CORRESPONDING DISK

(75) Inventors: Joël Bourgy, Moissy-Cramayel (FR); Jean-Pierre AndrëDenis David, Thomery (FR); Stëphane Jean-Daniel Maurice Derrien, Chilly-Mazarin (FR); Thierry-Jean Maleville, Milly la Foret (FR)

(73) Assignee: Snecma-Moteurs, Paris (FR)

( * ) Notice: Subject to any disclaimer, the term of this patent is extended or adjusted under 35 U.S.C. 154(b) by 19 days.

(21) Appl. No.: 10/226,208

(22) Filed: Aug. 23, 2002

(65) Prior Publication Data

US 2003/0039547 A1 Feb. 27, 2003

(30) Foreign Application Priority Data

Aug. 23, 2001 (FR) .......................................... 01 11022

(51) Int. Cl.[7] .............................. F01D 5/34; F01D 5/14
(52) U.S. Cl. .................. 416/234; 416/235; 416/223 A; 29/889.23
(58) Field of Search .............................. 29/889, 889.23, 29/889.7, 889.2; 416/234, 235, 223 R, 228, 236 R, 223 A, 238, 242, 243

(56) References Cited

U.S. PATENT DOCUMENTS 2,633,776 A * 4/1953 Schenk ..................... 29/889.23
2,962,941 A * 12/1960 Stein et al. ............... 29/889.23
5,556,257 A * 9/1996 Foster et al. ............. 29/889.23

FOREIGN PATENT DOCUMENTS

| EP | 0 666 407 | 8/1995 | |
|---|---|---|---|
| EP | 0 992 310 | 4/2000 | |
| FR | 980 201 | 5/1951 | |
| GB | 1 248 246 | 9/1971 | |
| JP | 60184445 A * | 9/1985 | ............ B21K/3/04 |
| JP | 02046945 A * | 2/1990 | ............ B21K/3/04 |

* cited by examiner

*Primary Examiner*—Edward K. Look
*Assistant Examiner*—Richard A. Edgar
(74) *Attorney, Agent, or Firm*—Oblon, Spivak, McClelland, Maier & Neustadt, P.C.

(57) ABSTRACT

A method of manufacturing a blisk comprises the steps of cutting a disk to a rough shape comprising a hub with a plurality of blade blanks projecting radially therefrom, machining each blade blank by tangential milling using a tool with a rotation spindle perpendicular to the radial direction to make repeated radial passes, the tool being turned through a facet angle with respect to the disk between each pass. Each blade blank is thus milled to a blade having faceted surfaces. Preferably, the width of each facet is smaller that 5 mm, and adjacent facets subtend angles smaller than 5°, or even more preferably smaller than 3°.

12 Claims, 6 Drawing Sheets

US 6,905,312 B2

METHOD OF MANUFACTURING AN INTEGRAL ROTOR BLADE DISK AND CORRESPONDING DISK

BACKGROUND OF THE INVENTION

1. Field of the Invention

This invention relates to a method of manufacturing an integral rotor blade disk, commonly referred to as a blisk and to blisks of characteristic shape produced in accordance with the method. A blisk comprises a hub and a plurality of blades integrally projecting substantially radially therefrom.

2. Summary of the Prior Art

The machining of the blades of a blisk from a solid disk in the raw state involves preliminary machining of the disk using a milling cutter with a large radius to leave blade blanks that have to be machined more finely to a definitive shape. It is common practice to resort to milling to perform this fine machining. Milling cutters used for this purpose have a special conical shape, and taper toward a rounded end allowing high-precision machining operations to be performed.

One known method is end milling in which the rotation spindle of the milling cutter is oriented radially with respect to the disk and rotates about each of the blades advancing gradually toward the hub of the disk, machining the blade in a helical path. The rotation spindle of the milling cutter is, in actual fact, inclined slightly so as to be away from the machined blade and so as to perform the machining essentially using the rounded end of the milling cutter. The height of pass, that is to say the pitch of the helix, is about half a millimeter, which means that the machining of a blade is not completed until several hundreds of passes have been made. This method is therefore fairly lengthy, and this limits the height of the blades to which it can be applied.

Another known milling method uses a milling cutter of the same conical shape, still rounded at the end, but with a longer conical part. As before, the milling cutter is arranged radially, but here, the end of the blade is milled with the conical part in a single broad tangential pass and then the root of the blade is, as previously, milled mainly using the end of the milling cutter in small passes. The broad pass saves time over the previous method even if the rate of advance of the tool has to be lowered; however, the swifter milling is accompanied by blade vibration and flexing which make it unsuitable for relatively tall blades. Furthermore, this method is more tricky to perform because of the risk of hollowing of the blade that additional unintentional machining by the conical part on an already-machined portion may cause.

SUMMARY OF THE INVENTION

The aim of this invention is therefore for a more convenient method of manufacturing a blisk using milling. The method proposed here is quick and applies to blades of all heights. It has the disadvantage of giving faceted blade surfaces, with a coarser appearance and which give rise to poorer flow, but it has been found that the corresponding loss in efficiency could be made very small if only modest irregularities are accepted.

In its most general form, the invention thus provides a method of manufacturing a blisk comprising a hub and a plurality of blades integrally projecting substantially radially therefrom, which method comprises the steps of cutting a disk to a rough state to form blade blanks therein; milling each of said blade blanks by tangential milling using a tool, said milling step comprising the steps of:

a) making a substantially radial pass with respect to said disk with said tool;

b) turning said tool through a facet angle with respect to said disk in a plane tangential to said disk; and repeating steps a) and b) until a blade has been milled from said blade blank.

One characteristic of the method is that the shape of the blade results essentially from the action of the main (particularly conical) part of the milling cutter rather than from its rounded end. The passes are parallel and with a small overlap; the height of pass is roughly equal to the height of the main part of the milling cutter, namely a few millimeters. As the area to be milled is the same in all the methods, it can be seen to what extent the number of passes, and consequently the machining time, is reduced.

The tool may have a conical central part, a rounded end part and a rounded part for connection to a rotation spindle, which part tapers toward the rotation spindle, the central part tapering toward the end part and connecting to the end part and to the connection part smoothly without forming a ridge.

An important advantage of the invention is the possibility of leaving an outer annulus joining the ends of the blade blanks, which plays a part in stiffening them and holding them during milling, thereby greatly reducing vibration and flexing. The annulus is a vestige of the disk in the raw state and is therefore integral with the blades; it is parted from them by a final machining operation undertaken after the blades have been given their definitive shape.

A blisk produced in accordance with the invention has a characteristic shape having faces of the blades formed of substantially radial longilinear facets. Such a blisk may be obtained by the method which has just been explained, but it is not excluded for it to be possible to obtain it in some other way. The facets may be immediately contiguous, particularly on a side of each blade corresponding to a suction face, but may be separated by concave connecting portions, at least on a side of each blade which corresponds to a pressure face, these portions being produced essentially by machining operations using the rounded end of the milling cutter.

It is advisable for the facets to have a width at most equal to 5 mm and for adjacent facets to subtend angles smaller than 5°, as this reduces the aerodynamic performance of the blade only by a small amount. It has also been found that below 3°, the loss of performance by comparison with a perfectly smooth blade was negligible.

DESCRIPTION OF THE PREFERRED EMBODIMENT

Figure 1:
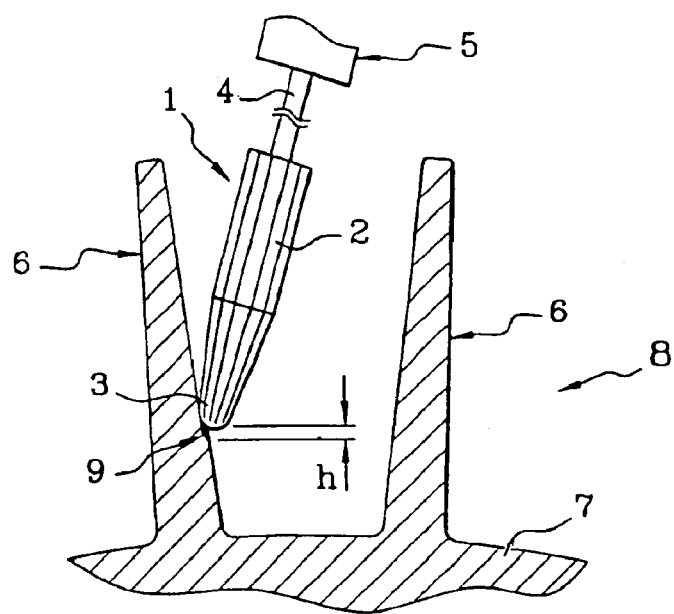
FIG. 1 shows a milling cutter used in a prior art method.

Milling cutters traditionally used for machining blades, such as the one generally indicated at 1 in FIG. 1, comprise a conical main part 2 ending in a rounded and more specifically hemispherical, tip 3. The main part 2 and the tip 3 are each covered with cutting teeth, and the milling cutter 1 rotates about a rotation spindle 4 driven by a numerically controlled machine 5 which is not depicted in detail. The tip 3 is applied to a blade 6 which, with other similar blades and a hub 7, makes up a blisk in the process of being machined. The spindle 4 and the milling cutter 1 have a substantially radial orientation with a small tangential inclination (with respect to the disk 8). The milling cutter 1 is moved at right angles to the page, making successive passes at respective heights along the blade 6, these passes being separated by heights such as h, the reference 9 denoting the section of the blade 6 which will be removed in the next pass.

Figure 2:
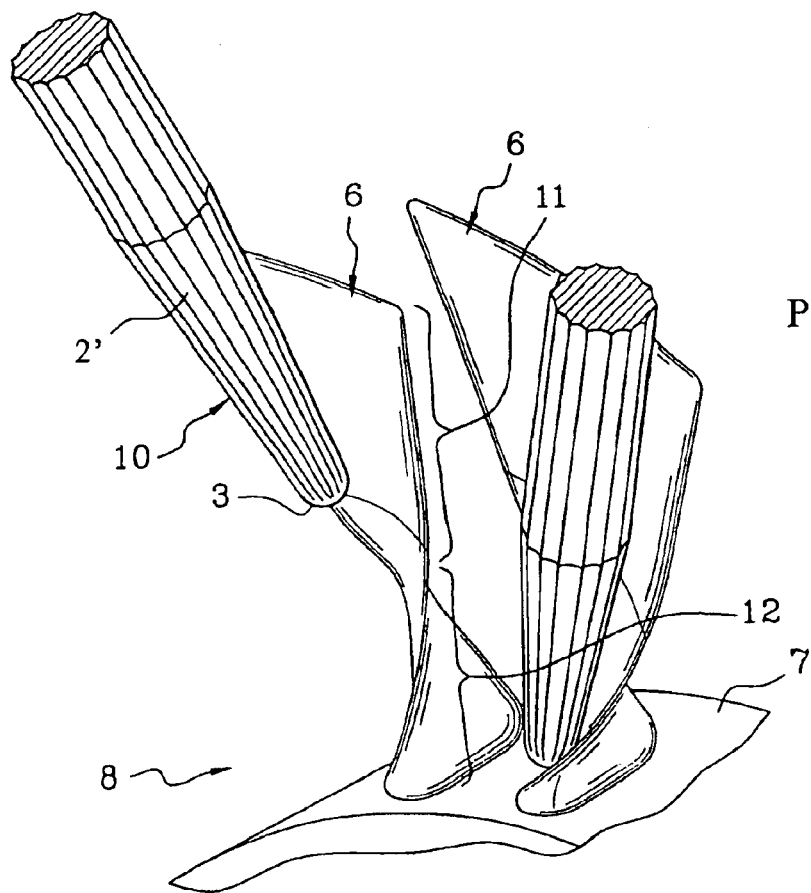
FIG. 2 shows a milling cutter used in another prior art method.

The milling cutter in FIG. 2 is indicated generally at 10 and comprises, between a hemispherical tip 3 and a rotation spindle 4 similar to those of the previous milling cutter 1, a conical main part 2' which is longer than the previous one 2. The blade 6 thus comprises a portion 11 which is machined in one pass by the main part 2', the complementary part 12 of the blade 6, near the hub 7, being machined by successive passes with the tip 3 of the milling cutter 10, as previously discussed with reference to milling cutter 1. Here again, the spindle 4 is held in a substantially radial position with a small inclination.

Figure 3:
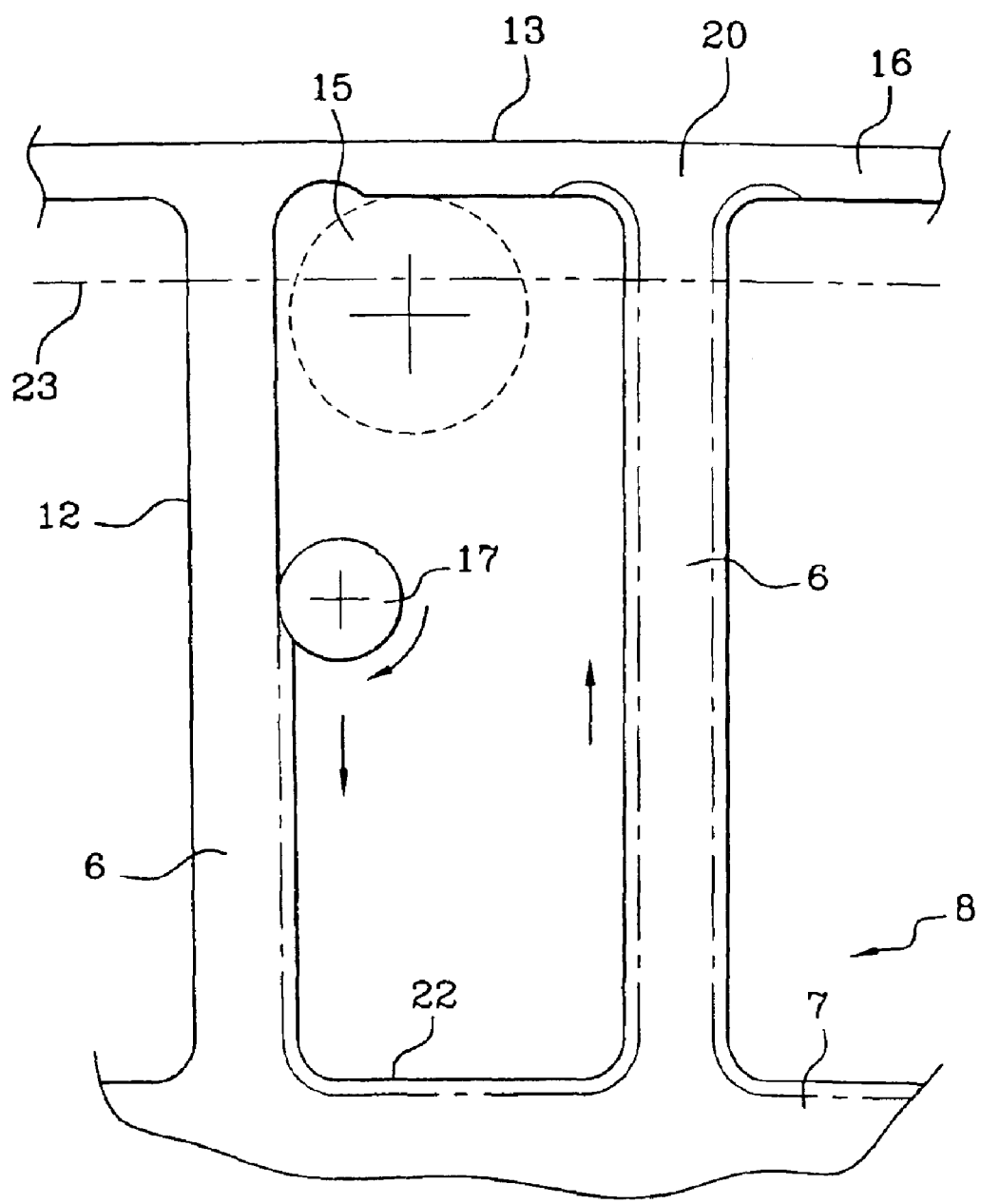
FIG. 3 shows, in a schematic view in a plane perpendicular to the axis of a disk, a disk having blade blanks being milled by a tool making substantially radial passes.
Figure 4:
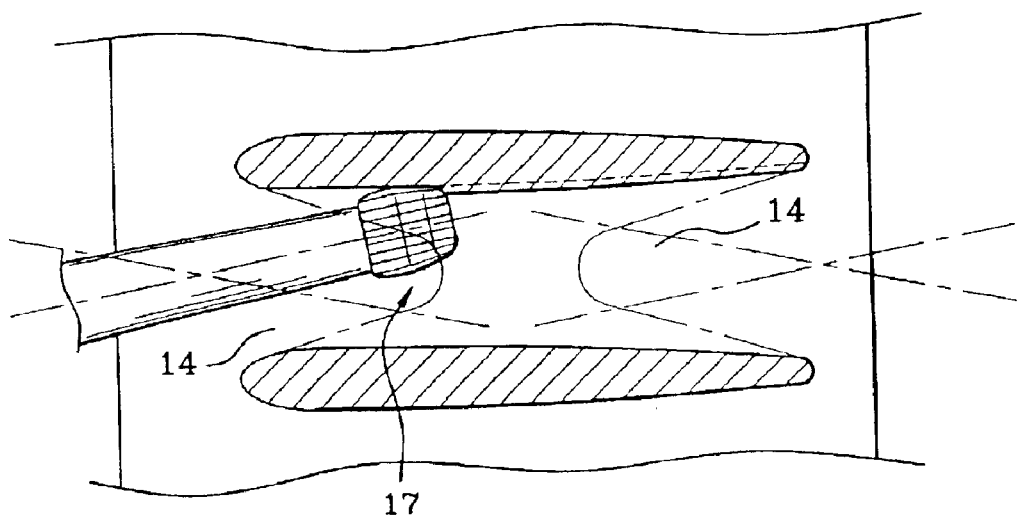
FIG. 4 corresponds to FIG. 3, but in a plane tangential to the disk.
Figure 5:
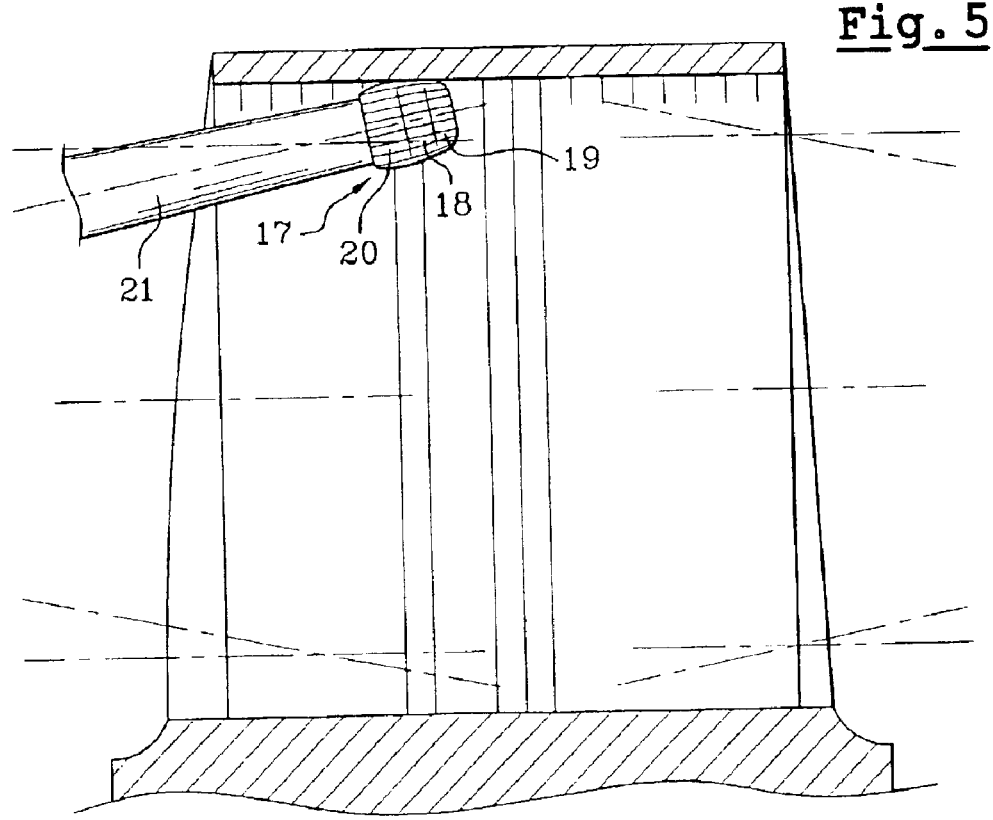
FIG. 5 corresponds to FIGS. 3 and 4, but in a plane radial to the disk.

Reference is now made to the method of the invention and to FIGS. 3, 4 and 5. The blades in the blade blank state, the hub and the disk are similarly referenced 6, 7 and 8 respectively. The disk in the raw state is solid and circumscribed inside a circumference 13 somewhat larger than the external radius of the blades 6 in the finished state.

A first stage consists in cutting the disk in the raw state to separate out the blade blanks 6. A variable proportion of the intermediate material may be removed.

In a preferred embodiment, use is made of a large cylindrical or conical milling cutter cutting slots 14 of modest depth between each blade blank, followed by an eccentric hole 15 passing not far from the finished form of one of the blades 6, leaving an annulus 16 on the outside of the disk blank which joins together the tips of the blades 6 and makes for a more rigid assembly.

A tool 17 of the invention can then be introduced. It is still a milling cutter, with three discernible parts: a central part 18 of conical shape, the edge of which forms an angle of approximately 10° with the tool axis, a rounded end part 19, and a part 20 for connection to a rotation spindle 21, which part 20 is also rounded, tapering toward the spindle 21. The parts 18 and 19 resemble the parts 2 and 3 of the known tools, but with certain slight differences: the main part 18 is shorter, being 10 mm tall if the milling cutter 17 is a part-finishing tool or just 5 mm tall if it is a finishing tool; and the end part 19 is not necessarily hemispherical, but may be flattened. The radii of curvature of the end 19 and connecting 20 parts may be 10 mm where they blend into the main part 18 and smaller elsewhere; it is appropriate for the profile of the milling cutter 17 to be smooth, that is to say no ridge is to be formed where the various parts meet. The milling cutter 17 may have a maximum diameter of 20 mm.

The rotation spindle 21 here is directed generally parallel to the axis of the disk 8, with a small tangential inclination as shown by FIG. 4 or radial inclination as shown by FIG. 5. These inclinations are essentially imposed in order to correct for the conicity of the main part 18 and to obtain machined surfaces in the desired direction. The conicity has the advantage that milling is accomplished with the rotation spindle 21 away from the milled surface; the tangential inclination is observed in order to mill the actual blades 6 proper and the milling cutter 17 is inclined in a substantially radial plane for the hub 7 or the annulus 16. The milling cutter 17 makes parallel and vertical passes along the blades 6; it can be seen in FIG. 3 that they begin in front of the hole 15 and may be performed in a closed loop around a gap between two blades, descending along one of the blades 6, then climbing back up along an opposite face of an adjacent blade 6, having run along the hub 7, to end at the annulus 16. The strips machined on each pass carry the reference 22 in FIGS. 3 and 5; their width approximately corresponds to the height of the main part 18 which performs most of the machining work and practically entirely dictates the finished shape of the blade 6. Thus this is almost purely tangential milling, unlike the previous designs. Milling is performed first of all using a part-finishing tool, then using a finishing tool, both of which are as per the description of the milling cutter 17, except that the main part 18 of the second tool is shorter.

Figure 9A:
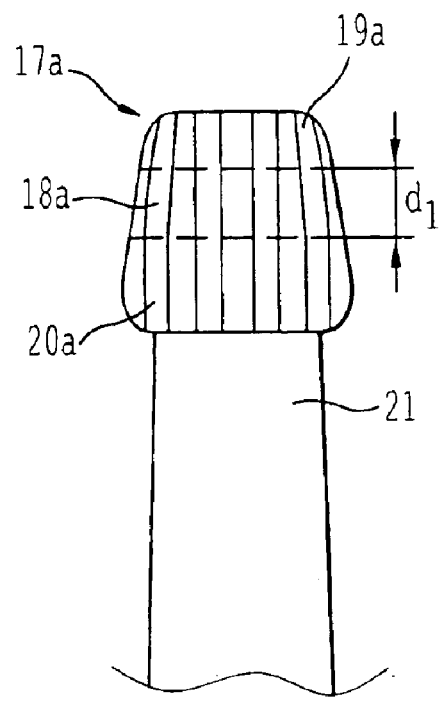
FIG. 9A depicts an embodiment of a part-finishing tool and FIG. 9B depicts an embodiment of a finishing tool.
Figure 9B:
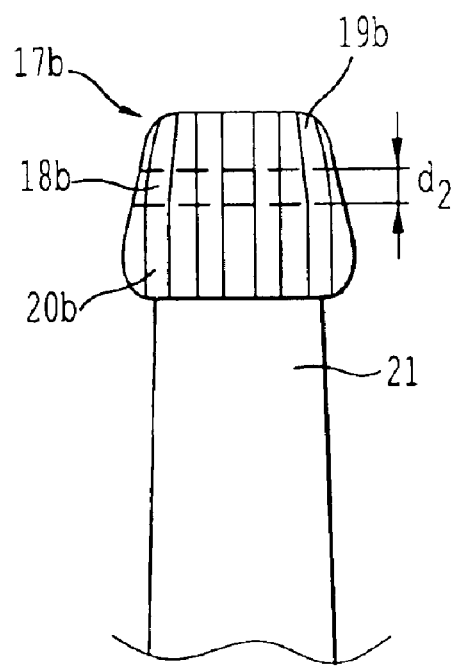

FIG. 9A depicts an embodiment of a part-finishing tool 17*a* having main part 18*a*, a rounded end part 19*a*, and a part 20*a* for connection to a rotation spindle 21. FIG. 9B depicts an embodiment of a finishing tool 17*b* having a main part 18*b*, a rounded end part 19*b*, and a part 20*b* for connection to a rotation spindle 21. The main part 18 of the part-finishing tool 17*a* has a length of distance $d_1$, and the main part 18*b* of the finishing tool 17*b* has a length of distance $d_2$, whereby $d_1$ is greater than $d_2$. Accordingly, the central part or main part 18*a* of the part-finishing tool 17*a* is taller than the central part or main part 18*b* of the finishing tool 17*b*.

The milling cutter 17 makes the passes 22 in succession, being driven each time more deeply into the slots 14. It is also turned through a facet angle, at most equal to 5°, in a plane tangential to the disk 8 between two passes 22. When all the blade blanks 6 of the disk 8 have been machined, the annulus 16 can be removed. The blade blanks 6 are, to that end, cut off at their ends, by installing a wire 23 of an electrical discharge machine on them. When the leading and trailing edges of the blades 6 have been machined, in a way which will not be described because the invention does not make any improvement to that, the definitive shape of the blades 6 is obtained.

Figure 6:
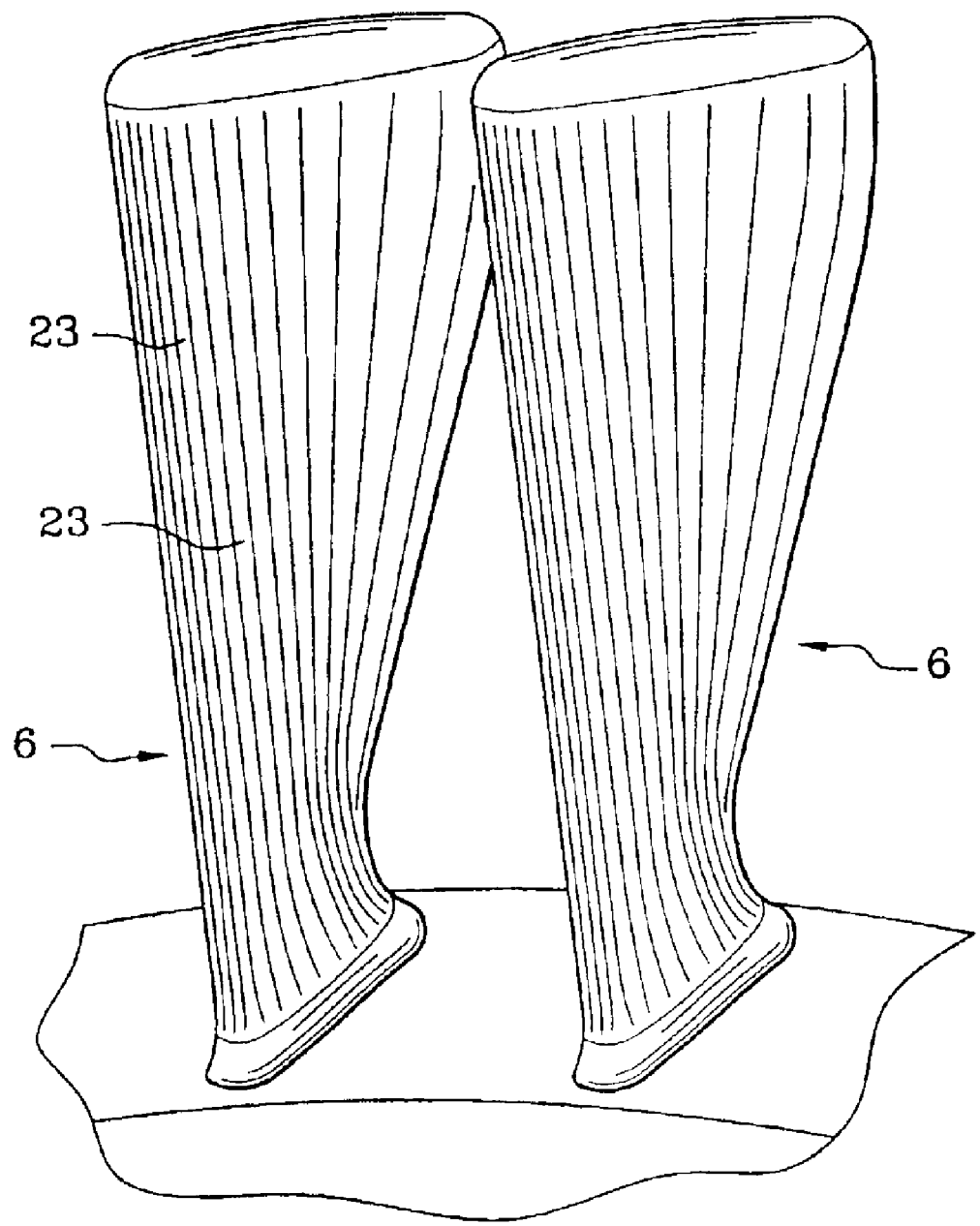
FIG. 6 shows, in a perspective view, blades obtained by the method of the invention.
Figure 7:
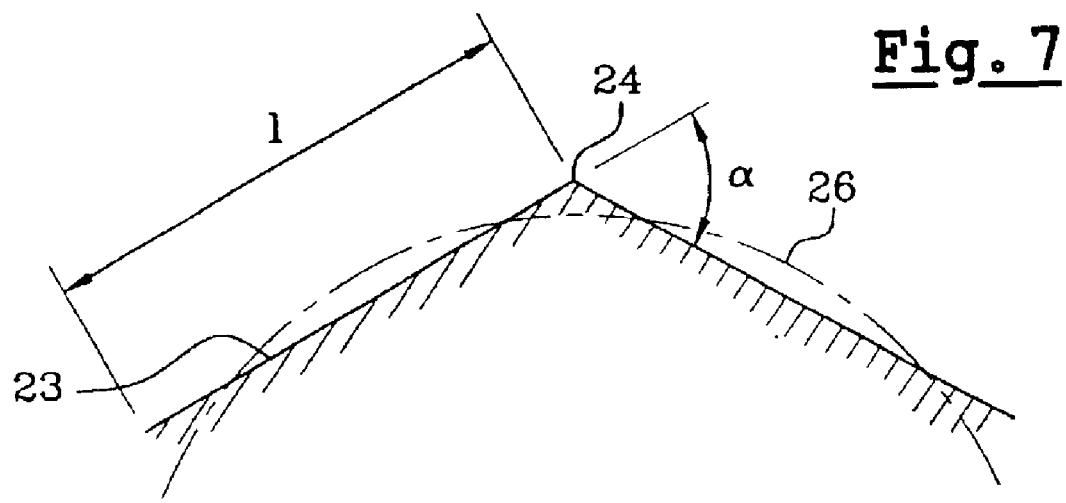
FIG. 7 is a schematic cross-sectional view on a plane of two facets on a face of a blade.
Figure 8:
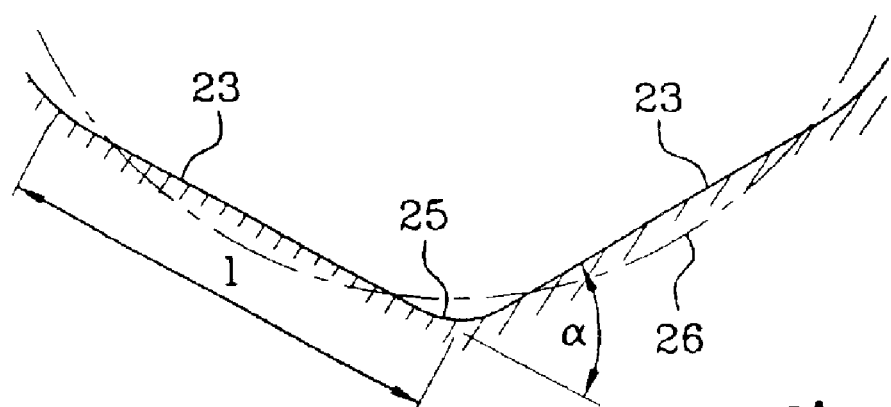
FIG. 8 corresponds to FIG. 7, but shows another face of the blade.

FIG. 6 depicts the appearance of the surfaces of blades 6: the passes each reveal a longilinear facet 23. As shown in FIG. 7, the consecutive facets 23 along a side of each blade 6 corresponding to a suction face are separated by a sharp angle 24. As shown in FIG. 8, the facets 23 on a side of each blade corresponding to a pressure face meet at a concave portion 25 produced by milling operations using the end part 19. In both instances, it is recommended that the variations in direction of adjacent facets 23 be smaller than 3°, which makes it possible not to suffer losses of aerodynamic efficiency greater than about 0.01%, nor furthermore to heat the air as it passes through the blisk 8 by more than 0.1° C. In practice, variations in angle ranging up to about 5° may be admitted. Thus, the distance between the ideal smooth profile 26 for the blade 6 and the actual profile does not exceed the small value of 0.02 mm for facets 23 of 5 mm width. Even smaller losses would be experienced with narrower facets 23 obtained using a shorter milling cutter, but with a higher number of passes.

The holding annulus 16 is not in any way compulsory to embodying the invention successfully, but it is necessary to guard against the risks of vibrational and static flexing of the blades 6 during milling by avoiding exciting the blades 6 at the resonant frequencies and perhaps by adjusting the position of the tool according to the deflection of the blades 6, which varies with the distance from the hub 7.

We claim:

1. A method of manufacturing a blisk comprising a hub and a plurality of blades integrally projecting substantially radially therefrom, which method comprises the steps of:
   cutting a disk to a rough state to form blade blanks therein;
   milling each of said blade blanks by tangential milling using a tool, said milling step comprising the steps of:
   a) making a substantially radial pass with respect to said disk with said tool;
   b) turning said tool through a facet angle with respect to said disk in a plane tangential to said disk; and
   repeating steps a) and b) until a blade has been milled from said blade blank, wherein the substantially radial passes are made over an entire surface of said blade blanks.

2. A method of manufacturing a blisk comprising a hub and a plurality of blades integrally projecting substantially radially therefrom, which method comprises the steps of:
   cutting a disk to a rough state to form blade blanks therein;
   milling each of said blade blanks by tangential milling using a tool, said milling step comprising the steps of:
   a) making a substantially radial pass with respect to said disk with said tool;
   b) turning said tool through a facet angle with respect to said disk in a plane tangential to said disk; and
   repeating steps a) and b) until a blade has been milled from said blade blank,
   wherein said tool has a conical central part, a rounded end part and a rounded part for connection to a rotation spindle, the rounded part for connection tapers toward said rotation spindle, said central part tapering toward said end part and connecting to said end part and to said rounded part for connection without a ridge.

3. A method of manufacturing a blisk comprising a hub and a plurality of blades integrally projecting substantially radially therefrom, which method comprises the steps of:
   cutting a disk to a rough state to form blade blanks therein;
   milling each of said blade blanks by tangential milling using a tool, said milling step comprising the steps of:
   a) making a substantially radial pass with respect to said disk with said tool;
   b) turning said tool through a facet angle with respect to said disk in a plane tangential to said disk; and
   repeating steps a) and b) until a blade has been milled from said blade blank,
   wherein said step of cutting the disk to a rough sate includes the formation of an outer holding annulus connecting said blade blanks, each said substantially radial pass running from said hub to said annulus, and wherein said method further comprises a step of parting said annulus from the blades after said blades have been milled.

4. A method of manufacturing a blisk according to claim 3, wherein said annulus is parted from said blades by wire electrical discharge machining.

5. A method of manufacturing a blisk comprising a hub and a plurality of blades integrally projecting substantially radially therefrom, which method comprises the steps of:
   cutting a disk to a rough state to form blade blanks therein;
   milling each of said blade blanks by tangential milling using a tool, said milling step comprising the steps of:
   a) making a substantially radial pass with respect to said disk with said tool;
   b) turning said tool through a facet angle with respect to said disk in a plane tangential to said disk; and
   repeating steps a) and b) until a blade has been milled from said blade blank,
   wherein said tool is inclined in a substantially radial plane at least at one of the ends of said passes.

6. A method of manufacturing a blisk according to claim 1, wherein said tool comprises a part-finishing tool, the method further comprising a step of replacing said part-finishing tool with a finishing tool, whereby the blade blanks are each milled completely twice.

7. A method of manufacturing a blisk comprising a hub and a plurality of blades integrally projecting substantially radially therefrom, which method comprises the steps of:
   cutting a disk to a rough state to form blade blanks therein;
   milling each of said blade blanks by tangential milling using a tool, said milling step comprising the steps of:
   a) making a substantially radial pass with respect to said disk with said tool;
   b) turning said tool through a facet angle with respect to said disk in plane tangential to said disk; and
   repeating steps a) and b) until a blade has been milled from said blade blank,
   wherein said tool comprises a part-finishing tool, the method further comprising a step of replacing said part-finishing tool with a finishing tool, whereby the blade blanks are each milled completely twice, and
   wherein each said tool has a conical central part, a rounded end part and a rounded part for connection to a rotation spindle, the rounded part for connection tapers toward said rotation spindle, said central part tapering toward said end part and connecting to said end part and to said rounded part for connection, wherein said part-finishing tool has a taller central part than said finishing tool.

8. A blisk which comprises blades having faces formed of substantially radial longilinear facets, wherein said facets extend over an entire surface of said blades.

9. A blisk according to claim 8, wherein said facets are separated by concave connecting portions at least on a side of each blade which corresponds to a pressure face.

10. A blisk according to claim 8, wherein adjacent facets subtend angles smaller than 5°.

11. A blisk according to claim 9, wherein adjacent facets subtend angles smaller than 3°.

12. A blisk according to claim 9, wherein said facets have widths at most equal to 5 mm.

* * * * *